United States Patent [19]

Florczak

[11] 4,035,923
[45] July 19, 1977

[54] STAND-OFF ARRANGEMENT FOR LEVELS

[76] Inventor: Henry Florczak, 528 Imlay Place, Bound Brook, N.J. 08805

[21] Appl. No.: 724,305

[22] Filed: Sept. 17, 1976

[51] Int. Cl.² .............................................. G01C 9/00
[52] U.S. Cl. .................................... 33/374; 248/214; 248/228
[58] Field of Search .............................. 33/370–376, 33/379–383; 248/214, 228

[56] References Cited
U.S. PATENT DOCUMENTS

| 1,945,332 | 1/1934 | Robinson | 248/228 X |
| 2,154,625 | 4/1939 | Kleineschay | 33/370 X |

Primary Examiner—Charles E. Phillips

[57] ABSTRACT

A stand off for masonry or carpentry levels is disclosed which includes a substantially U-shaped portion having a clear-drilled boring through which a spring-tensioned cylindrical body extends having fastened at one end a disc-shaped end section enclosed within the U-shaped portion and at its opposite end, a disc-shaped pad for touching engagement with objects whose level is to be measured.

4 Claims, 4 Drawing Figures

STAND-OFF ARRANGEMENT FOR LEVELS

BACKGROUND OF THE INVENTION

The invention concerns ancillary devices, namely stand offs, which can be affixed to a conventional masonry of carpentry level to enable the level to be used to bridge imperfections or obstructions in the surface to be measured.

Often, it is desired to estimate the level between surface points but because the intermediate area is distorted, roughened or bowed, the level cannot be used. For example, this problem commonly occurs with wood which, due to excessive moisture or uncontrolled drying, has bowed. It also occurs during construction of masonry walls (e.g., brick, stone, etc.) where because of the surface roughness, or joint compounds, a conventional level cannot be conveniently used.

A particularly unique problem occurs with brick walls where, during construction, the separate corners are slightly out of "plumb." In the past, the next course of brick would be layed up to equalize the difference between the different corner heights. This can only be done by those highly skilled practioners who have had sufficient experience with this type of problem so as to be able to gradually equalize the differences without distorting the appearance of the wall.

Accordingly, it is an object of this invention to provide portable devices which can be slipped onto a level and thereon adjusted to suit particular conditions of a surface to be measured and act as a stand off to bridge distorted intermediate regions on the measured surface.

The foregoing object as well as others are achieved in accordance with my invention which comprises a pair of slidably mounted stand offs. Conventional masonry and carpentry levels employ I-beam construction and my stand offs are specifically designed to work with them. Each stand off includes a spring-tensioned clamp which is formed by the "in-turned-38 ends of a U-shaped member and an internal spring-tensioned shaft. The shaft, which has a disc mounted at one end to engage the in-turned ends, may be momentarily withdrawn under tension to allow the stand off to be easily slipped over either parallel side of the level. When the shaft is released the stand off is firmly positioned on the level and held there by the spring tension.

Importantly, the aforementioned problem of correcting for out of plumb corners may be solved using my invention. The slidable stand offs can be set to touch the true course point as well as the out of line elevation to give a new corrected line for successive courses of brick.

BRIEF DESCRIPTION OF THE DRAWING

The invention will be further appreciated from a consideration of the drawing which includes.

DETAILED DESCRIPTION

Figure 1:
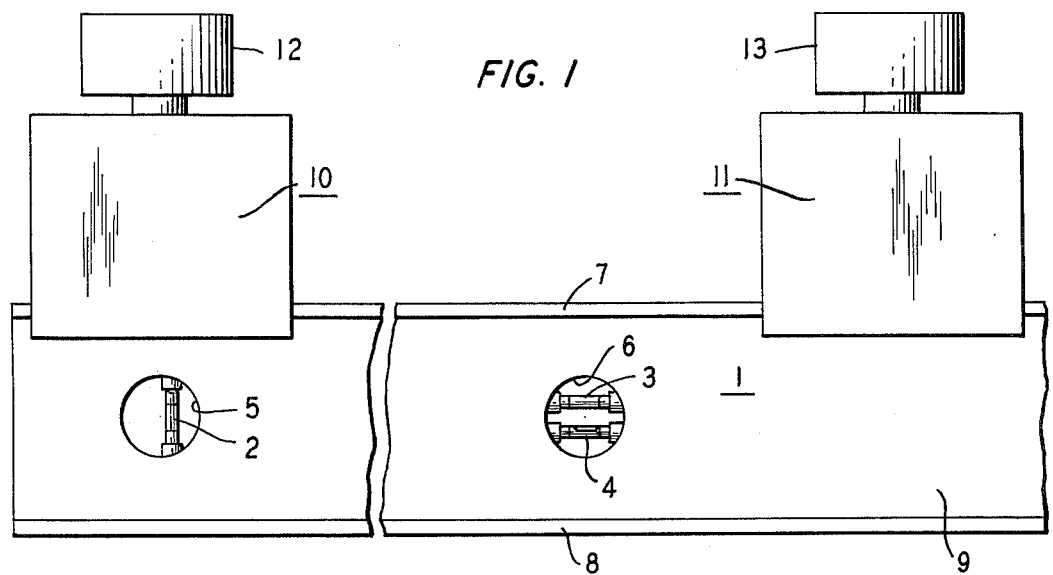
FIG. 1 showing a side view of a conventional carpenter's level with a pair of stand offs mounted on top.

Turning our attention initially to FIG. 1, it depicts a carpenter's level 1 having conventional indicating vials 2-4 mounted respectively in apertures 5 and 6. As will be explained hereinafter in more detail, level 1 has the typical I beam construction with a top rail 7 parallel to a bottom rail 8 and a vertical (or web) plate 9 holding the rails apart in spaced relationship.

FIG. 1 shows two stand offs 10 and 11 which are the subject invention and which are clamped onto top rail 7. In this position it can be seen that vial 3 (usually associated with top rail 7) indicates how level a surface is which comes into contact simultaneously with pads 12 and 13.

Figure 3:
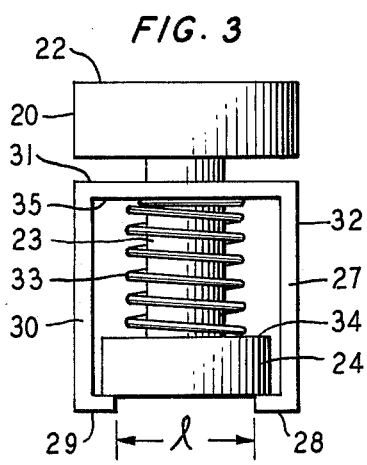
FIG. 3 showing the full assembly of a stand off.
Figure 4:
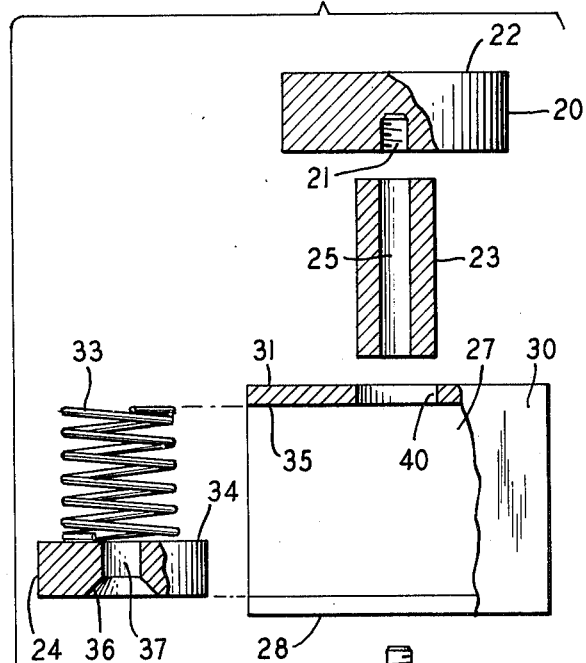
FIG. 4 showing the stand off disassembled for examination of each of its component parts.

The component parts of this invention will now be described with respect principally to FIG. 4 with occasional reference to FIGS. 2 and 3. As shown, each stand off comprises six components including disc-shaped member 20 having an internally threaded (or tapped) section 21. Surface 22 is smooth and can be polished to insure substantial contact with the surface to be measured.

Figure 2:
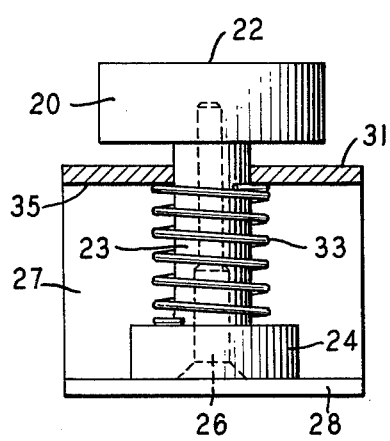
FIG. 2 showing a cross section of one stand off.

Cylindrical section 23 is a spacer element which, as shown in FIG. 2, separates member 20 from disc 24. Section 23 has a clear bore 25 running its entire length to accommodate threaded machine screw 26.

The next component is a U-shaped central member 27 with in-turned ends 28 and 29 defining a longitudinal slot. Member 27 is substantially rectangular with three sides 30–32 and a fourth side machined to leave ends 28 and 29 forming a shoulder. The length $l$ (FIG. 3) is sufficient to allow clearance for web 9 and level 1 and to catch end portions of disc 24.

Spring 33 is assembled around cylindrical section 23 and it is held between top surface 34 of disc 24 and the inside top surface 35 of member 27. In this position, as member 20 is lifted, the entire assembly consisting of member 20 joined to section 23 and disc 24 is under increasing tension.

Disc 24 is predrilled and bored to have internal countersunk surface 36 and clear bore 37, the latter being in axial alignment with bore 25 and tapped surface 21 when assembled. In this manner, screw 26 is flush mounted in disc 24.

The aforenoted invention is not necessarily limited to I-beam construction of carpentry levels and may be modified by those skilled in the art to work with most known types of carpentry levels.

What is claimed is:
1. A removable stand-off arrangement for masonry levels having I beam construction comprising:
   a rectangular central member having a top aperture and a bottom longitudinal slot, said central member having in-turned end sections defining said longitudinal slot,
   an integral subassembly including a pair of disc-shaped end sections joined by a cylindrical spacer section, said subassembly being partially situated inside of said central member with said cylindrical spacer section within said top aperture and one of said disc-shaped end sections confined within said central member, and
   a tensioning spring wrapped about said spacer section and being in touching engagement with a top surface of said last-mentioned disc-shaped end section and an interior surface of said central member when under tension.
2. The invention recited in claim 1 wherein said subassembly parts consisting of said end sections and said spacer section may be disassembled into three separate parts, and reassembled within said central member and secured therein as an integral subassembly through axial aligned apertures in each of said parts.

3. A portable stand-off arrangement for levels comprising:
a central member being substantially rectangular in cross section and having a slotted opening running longitudinally on one of its sides and a centrally situated aperture in a side opposite said slot;
a cylindrical member inserted in said aperture and having a longitudinal boring therethrough;
top and bottom disc members mounted on said cylindrical member and affixed thereto by a threaded insert which engages axially aligned borings in said disc member; and
a spring installed on said cylindrical member and held in place between said bottom disc member and the internal surface of said opposite side of said central member.

4. The invention recited in claim 3 in combination with level having an I beam construction adapted to mate with said central member.

* * * * *